US009823947B2

(12) United States Patent
Chang et al.

(10) Patent No.: US 9,823,947 B2
(45) Date of Patent: Nov. 21, 2017

(54) METHOD AND SYSTEM FOR ALLOCATING FPGA RESOURCES

(71) Applicant: International Business Machines Corporation, Armonk, NY (US)

(72) Inventors: Xiaotao Chang, Beijing (CN); Fei Chen, Beijing (CN); Kun Wang, Beijing (CN); Yu Zhang, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/195,046

(22) Filed: Jun. 28, 2016

(65) Prior Publication Data

US 2016/0306663 A1 Oct. 20, 2016

Related U.S. Application Data (63) Continuation of application No. 14/418,687, filed as application No. PCT/CN2013/078047 on Jun. 26, 2013, now Pat. No. 9,389,915.

(30) Foreign Application Priority Data

Jul. 31, 2012 (CN) .......................... 2012 1 0270573

(51) Int. Cl.
  *G06F 9/46* (2006.01)
  *G06F 9/50* (2006.01)
  *G06F 9/48* (2006.01)

(52) U.S. Cl.
  CPC .................. *G06F 9/50* (2013.01); *G06F 9/48* (2013.01); *G06F 9/4881* (2013.01);
  (Continued)

(58) Field of Classification Search
  None
  See application file for complete search history.

(56) References Cited

U.S. PATENT DOCUMENTS 6,704,816 B1 3/2004 Burke
7,058,921 B1 6/2006 Hwang et al.
(Continued)

FOREIGN PATENT DOCUMENTS

CN 101788927 A 7/2010
EP 1 257 928 B1 12/2005
(Continued)

OTHER PUBLICATIONS

Fornaciari et al., "Virtualization of FPGA via Segmentation", FPGA2000 ACM/SIGDA International Symposium on Field Programmable Gate Arrays, Monterey, CA, USA—Feb. 10-11, 2000, pp. 1-11.
(Continued)

*Primary Examiner* — Charles Swift
(74) *Attorney, Agent, or Firm* — Scully, Scott, Murphy & Presser, P.C.; David M. Quinn, Esq.

(57) ABSTRACT

System, method and computer program product for allocating FPGA resources in a resource pool. In an embodiment, the technical solution includes: receiving resource request for FPGA resources in the resource pool from a client; performing resource allocation operation based on resource pool state information record in response to the resource request, the resource pool state information record including utilization state information of the FPGA in the resource pool; and updating the resource pool state information record based on the result of the resource allocation operation. FPGA resource allocation can be implemented with the adoption of the technical solution of the application.

17 Claims, 3 Drawing Sheets

(52) U.S. Cl.
CPC ............ *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5038* (2013.01); *G06F 9/5044* (2013.01); *G06F 2209/5011* (2013.01)

(56) References Cited

U.S. PATENT DOCUMENTS

| | | | |
|---|---|---|---|
| 7,627,458 | B1 | 12/2009 | Van Mau et al. |
| 2004/0049672 | A1 | 3/2004 | Nollet et al. |
| 2006/0015313 | A1* | 1/2006 | Wang ................... G06F 17/5027 703/14 |
| 2006/0136570 | A1* | 6/2006 | Pandya ............. G06F 17/30985 709/217 |
| 2008/0271039 | A1 | 10/2008 | Rolia et al. |
| 2009/0103557 | A1 | 4/2009 | Hong et al. |
| 2009/0239480 | A1 | 9/2009 | Rofougaran et al. |
| 2010/0058009 | A1 | 3/2010 | Fujibayashi |
| 2010/0293269 | A1 | 11/2010 | Wilson et al. |
| 2012/0023149 | A1 | 1/2012 | Kinsman et al. |
| 2013/0346979 | A1 | 12/2013 | Nightingale et al. |

FOREIGN PATENT DOCUMENTS

| | | |
|---|---|---|
| WO | WO2011066459 A2 | 6/2011 |
| WO | WO2014/019428 A1 | 2/2014 |

OTHER PUBLICATIONS

Jean et al., "Dynamic Reconfiguration to Support Concurrent Applications", IEEE Transactions on Computers, vol. 48, No. 6, Jun. 1999, pp. 591-602.

International Search Report PCT/CN2013/078047.

* cited by examiner

METHOD AND SYSTEM FOR ALLOCATING FPGA RESOURCES

BACKGROUND

The present disclosure relates to resource virtualization, and more specifically, to a method and system for allocating FPGA resources.

Nowadays, more and more hardware or software resources may be used by users with based on visualization, and with the widespread of the implementation of cloud computing, IaaS (Infrastructure as a Service) is becoming a popular way of using resources. However, conventional resource visualization is mainly directed to infrastructure resources such as a processor, a memory, storage means or networks and does not relate to the visualization of Field Programmable Gate Array (FPGA).

FPGA as a semicustom circuit to be used repeatedly has not only overcome the drawbacks of custom circuit, but also the disadvantage of the original programmable gate circuit of having a limited number of circuits. The same piece of FPGA may create various circuitry functions via various programming data and thus FPGA is found very flexible is usage. Currently, FPGAs are available in many sorts: such as the Virtex series from XINLINX Corporation, the TPC series from the TI Corporation, the FIEX series from ALTERA Corporation, among which the Virtex-7 series of FPGA from XILINX Corporation may achieve 120 AES encryption/decryption acceleration units on one FPGA chip or 260 ARM processor core, and if provided for use to the users in a manner of visualization, then the efficiency of employing FPGA resources may be greatly improved.

In summary, one will know that as a special type of resource, FPGA has not yet become visualized resource which leaves room to the prior art to improve.

SUMMARY

According to one aspect of the present disclosure, there is provided a method for allocating FPGA resources in a resource pool, comprising: receiving resource request for FPGA resources in the resource pool from a client; performing resource allocation operation based on resource pool state information record in response to the resource request, said resource pool state information record including utilization state information of the FPGA in said resource pool, and updating said resource pool state information record based on the result of said resource allocation operation.

According to another aspect of the present disclosure, there is provided a system for allocating FPGA resources in a resource pool, comprising: a reception means, configured to receive resource request for FPGA resources in the resource pool from a client; a resource allocation operation means, configured to perform resource allocation operation based on resource pool state information record in response to the resource request, said resource pool state information record including utilization state information of the FPGA in said resource pool; and an updating means, configured to update said resource pool state information record based on the result of said resource allocation operation.

With the technical solution of the present disclosure, FPGA resources in the resource pool may be allocated according to resource requests of the client and therefore improving the utilization efficiency of the FPGA resource.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
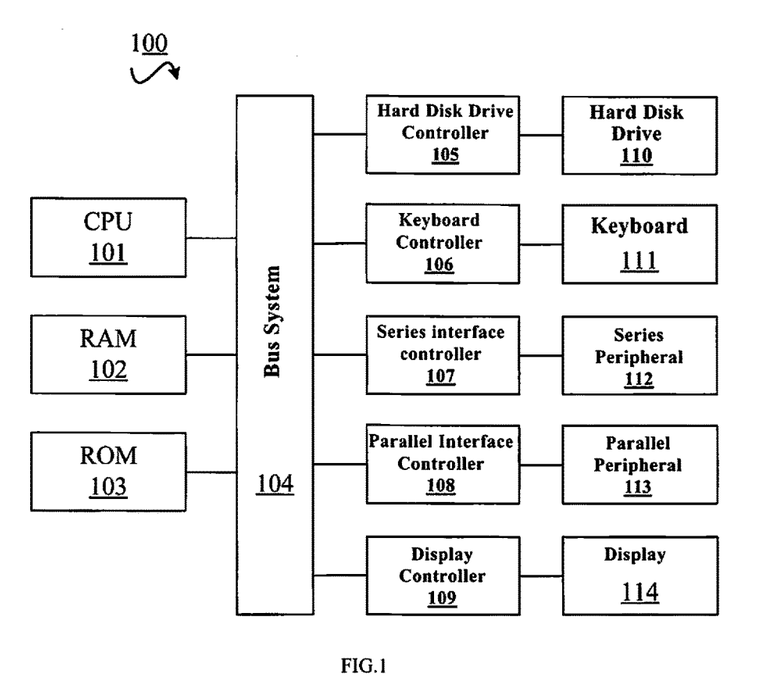
FIG. 1 shows a block diagram of an exemplary computer system 100 which is applicable to implement the embodiments of the present disclosure.

FIG. 1 shows an exemplary computer system 100 which is applicable to implement the embodiments of the present disclosure. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present disclosure. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
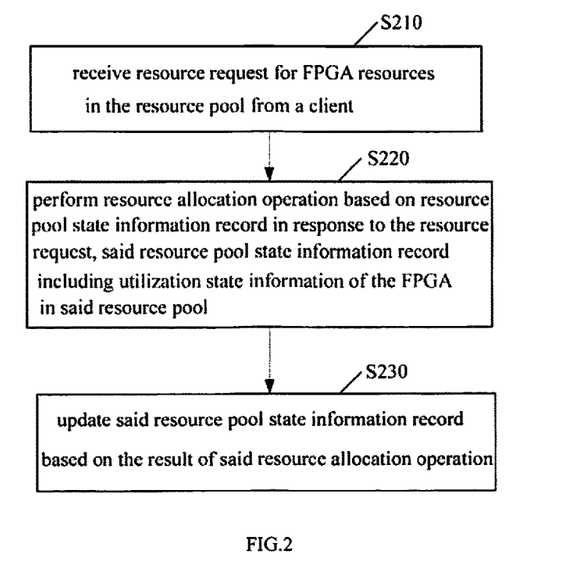
FIG. 2 shows a flowchart of a method for allocating FPGA resources.

With reference now to FIG. 2, a method for allocating FPGA resources in a resource pool in accordance with an embodiment of the present invention will be described.

At Step 210, a resource request for FPGA resources in the resource pool is received from the client. Forms of the client are not limited and can be either a general physical client or a virtual client.

A control module may be configured for implementing said receiving step. For example, a FPGA resource request is made while a virtual machine is created then said request may be received by the control module positioned in a virtual machine monitor (VMM). As the control module is apparently a separate controlling module and does not necessarily locate in the virtual machine monitor, one skilled in the art can implement said control module in other manners.

In general, a resource request comes in many forms. In one embodiment, the resource request being received is in the form of functional unit bandwidth, which includes at least the type of the requested functional unit and the requested bandwidth. In another embodiment, the resource request being received is in the form of programmable resource, which includes at least the type and quantity of the requested resource. In the present application, a "functional unit" particularly refers to functional unit examples are provided with certain functions by configuring FPGAs, such as an AES encryption functional unit. The "functional unit" is apparently distinct from various types of programmable resources inherently in the FPGA, such as LUT, DSP slice etc. In which, LUT is the abbreviation for Look-Up-Table and it is essentially a RAM. Currently, 4-input LUT is often used in FPGA, therefore each LUT may be taken as a RAM with 4-bit address line. After a logic circuit is described by user with a principle diagram or HDL language, the PLD/FPGA developing software will calculate all possible results of the logic circuit and write a truth table (i.e. the result) into RAM, and in this way, every time when a signal is input for logic calculation, an address is input /或 every time a signal is input for logic calculation, it counts as inputting an address) to look up in the table to find the corresponding content of the address and output it. For other types of programmable resources which are known to a person skilled in the art, descriptions thereto will not be repeated here.

The control module may perform different process directed to different resource requesting manners. In the following, it will be thoroughly illustrated in the descriptions of Step 220 as how resources are allocated based on resource pool state information record in response to resource requests of various types.

At Step 220, resource allocation operation is performed based on resource pool state information record in response to the resource request, said resource pool state information record includes the utilization state information of the FPGA in the source pool.

In one embodiment, it is in the control module where said resource pool state information record is created and maintained, in order to record and determine the resource's current utilization state of all FPGAs in the resource pool so as to respond to resource requests from each client (including applications in the client).

FPGA resource utilization state information record may be implemented with any existing data structure, such as a data sheet for storage. Based on specific needs, the resource pool state information record of the FPGA resource pool may have several levels. In one embodiment, it comprises three levels with the following logical relationship: the resource pool state information record of a FPGA is a FPGA chip sheet, and this level of sheet/or at this level, said sheet describes how many FPGA chips in total are in the resource pool, and the overall resource utilization state of each FPGA. Optionally, each item of record in the first level of state record information may further include a second level sheet which describes how many functional units are created in one FPGA chip and the corresponding state information of the functional unit. Optionally, each item of record in the second level of sheet may further include a third level sheet, i.e. the application information record of the functional unit, said application information record includes at least the identification code of the requestor who has requested that functional unit and the bandwidth of the functional unit occupied by that requestor, in which, said identification code of the requestor is the identification information generated in response to the requestor's opening of one allocated functional unit. This level of sheet describes the utilization state information of one functional unit by each requestor (e.g. application in the client) of that one functional unit, where the information includes at least the identification code of the requestor (i.e. SID) and the QoS information (e.g. the functional unit processing bandwidth information occupied by the user). A more specific three-level-structured state sheet will be exemplified in FIG. 3A and its description, however, it should be noted that although a three-level-sheet is given as an example herein, it does not necessarily mean that all embodiments need three-level-state-sheet which will be explained further later.

Next, descriptions will be made on how resource allocation operation is performed based on resource pool state information record at Step 220.

In one embodiment, when the above described resource request is one in the form of programmable resource, in said resource allocation operation, said resource pool state information record is traversed, and the FPGA resource satisfying the type and quantity of the requested programmable resource will be determined based on said utilization state information of said FPGA and allocated to said client.

Specifically in the embodiment a set of resource requests as shown in Table 1 is received from one client.

TABLE 1

LUT elements, 50M
Block memory, 16M
. . .

Said resource requests include at least the type and quantity of the FPGA programmable logical resource required by said client in which each row represents a specific resource request: the first resource request shows a request for LUT of 50M, and the second resource request shows a request for a block memory of 16M. The type of programmable logical resources includes but is not limited to Look-Up-Table (LUT), block memory, DSP slices and clock lines etc. Accordingly, when the above resource request is received, first the FPGA chip sheet will be traversed to check whether and which FPGA chips has sufficient spare source to meet said requirements, and if yes, then allocation will be performed immediately/directly; if no, meaning unable to deal with this case, then new FPGA chip may be added by the system administrator to meet said requirements, and based on the disclosure of the present application, one skilled in the art may readily conceive of other processing ways such as denying the request etc., and the details are omitted here.

In another embodiment, when the above resource requests are ones in the form of functional unit bandwidth and said resource pool state information record also includes the functional unit information record of FPGAs, said functional unit information record includes at least the functional unit information which has been created in said FPGA, with the functional unit information including e.g. identification code of the functional unit, type and performance of the functional unit and the status of resource allocation etc. In turn, in said resource allocation operation, said resource pool state information record is traversed, it is determined based on said functional unit information record whether an already-created functional unit satisfying the type and bandwidth of the said requested functional unit is found. In turn, in response to a "found", the found functional unit is allocated to said client; in response to a "not-found", new functional unit will be created and allocated to said client. Alternatively in response to a "not-found", the resource request from the client may be denied.

Specifically, the embodiment can be illustrated with a more specific example. Now refer to Table 2, which is a set of resource requests received from a client.

TABLE 2

AES, 128 MBps, best effort
RC4, 128 MBps, guaranteed
Decomp, 1 GBps, guaranteed
XML, 512 MBps, best effort
. . .

Said resource requests include at least bandwidth information, functional unit information and optionally may further include type information of the requirement such as best effort and guaranteed. Each row in Table 2 represents a specific resource request, e.g. the first item shows requiring an encryption resource with AES algorithm of 128 MBps of bandwidth.

Once this request is received, the FPGA chip sheet (resource pool state information record sheet) will be go through, and for every FPGA chip that is found, its functional unit sheet will be go through. If a functional unit example (e.g. an AES encryption unit) in accordance with the requirements can be found, then it is determined whether this functional unit can provide sufficient spare bandwidth. If yes, then the spare bandwidth is proved to VM. If no, then further determination will be performed according to the type of the requirement and the allocation strategy. It should be noted that, how to determine the strategy of FPGA resource allocation according to the type of requirement is not obligatory. For example, if the type of said requirement is a best effort service, then it depends on whether said functional unit example can satisfy the bandwidth requirement. If yes, then an allocation may be performed; if no, then the request will be denied immediately. If the type of said requirement is a guaranteed service, then go through of the FPGA chip sheet and functional unit sheet should be continued to look for the next functional unit example that satisfy the requirements.

If after all FPGA chip have been traversed but still no functional unit example satisfying the requirements is found, then it will be determined whether a configuration file (bitfile) for creating this type of functional unit is present in the system. If no, then it means unable to deal with this case, and the system administrator will be in charge of adding corresponding configuration file. If yes, then the FPGA chip sheet will be traversed to look for a FPGA chip that has sufficient spare programmable resource therein to create such a functional unit example. If it /such a chip/ can not be found, then the control module is /assumed to be not able/ unable to deal with this case and the system administrator should be in charge of authorizing it /the control module. If it is authorized to do so, then it will issue commands to selected FPGA chips, create the functional unit example that is required and perform bandwidth resource allocation.

A corresponding update of the FPGA state record information sheet is required in all the above processes of resource allocation and functional unit creation. Apparently, in this embodiment, mainly the resource pool state information record and functional unit information record are used. It should be appreciated by one skilled in the art that the above two embodiments may be used separately or in combination.

At Step 230, said resource pool state information record is updated based on the result of said resource allocation operation. Via this step, the FPGA state record information may be modified accordingly during the process of responding to the resource request, so as to reflect variations of the FPGA resource utilization state. In response to a success in performing said resource allocation operation, the interface information of the successfully requested FPGA resource may be transmitted to said client.

Figure 3:
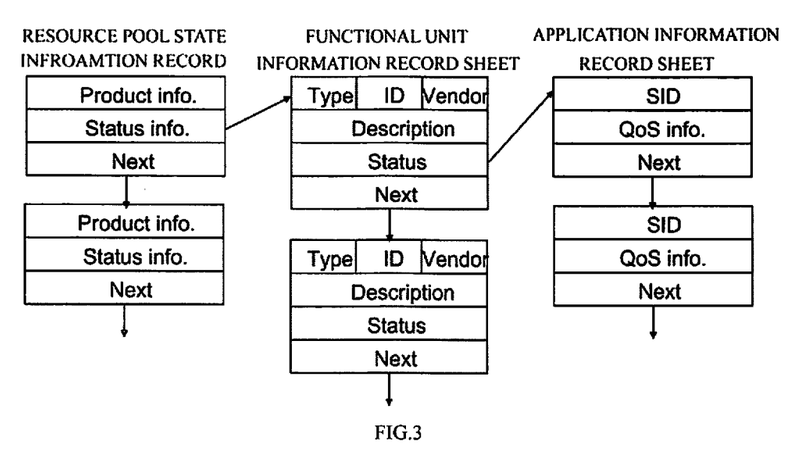
FIG. 3 shows a schematic view of a three-level state information record sheet.

FIG. 3 shows a schematic view of a three-level state information record/log sheet. In this embodiment, the FPGA state record information is comprised of three-level-sheet with the following logical relationship shown in FIG. 3

As it can be seen from the information of diagram, the first level of the FPGA state record information is a FPGA chip sheet. In one embodiment, this level of sheet describes how many FPGA chips in total are in the system and the overall resource utilization state of each FPGA. At this level, every item of record /namely/ describes the information of one FPGA chip, in which the information includes at least the FPGA identification code (in the Chip info.field) and the FPGA programmable resource allocation status information (i.e. what is remained in all the programmable resource of that piece of FPGA, or in other words, the proportion of the spare programmable resource, which is included in the Status info.field). In addition to the above information, every item of record may optionally further include a second level sheet.

The second level of the FPGA state record information is a functional unit sheet. This level of sheet describes in one FPGA chip how many functional units have been created and the corresponding state information of that functional unit. In the second level of sheet, every item of record describes the information of one functional unit, in which the information should include at least the function type (e.g. encryption, compressing etc.) of that functional unit, the identification code of that function unit, the performance information (e.g. the maximum bandwidth information, included in the Description field), the resource allocation status information (i.e. the proportion of the yet spare bandwidth of that functional unit) etc. In addition to the above information, every item of record may optionally further include a third level sheet.

The third level of the FPGA state record information is an application information record sheet. This level of sheet describes the utilization state information of one functional unit by each user (e.g. an application in the client) of that functional unit. In the third level of sheet, every item of record describes the utilization state information of that functional unit by a user, in which the information includes at least the user identification code information (i.e. SID) and QoS information (i.e. the information of the functional unit processing bandwidth that may occupied by that user), and that third level application sheet may assist the management of quality of service (QoS).

The client may be allocated FPGA resources according to its request in accordance with the technical solution described in the above manner. However, in practical operative process, the management of quality of service (QoS) may be involved, especially in the situation where virtual resources are allocated according to requests including the type of functional unit and bandwidth, it is necessary to control the usage of that client to not exceed the allocated bandwidth during the operative process of the client.

Figure 4:
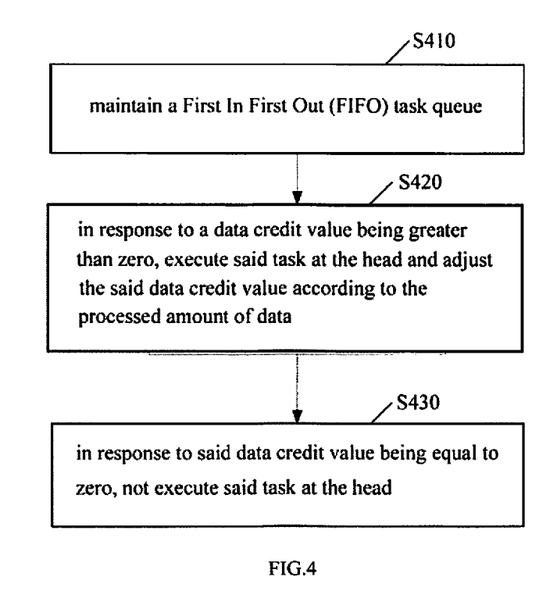
FIG. 4 is a schematic diagram of an example of implementing an embodiment of the disclosure to perform bandwidth control.

FIG. 4 is a schematic diagram of implementing an embodiment of the invention to perform bandwidth control, and in the embodiment, the control of bandwidth is implemented with a first in first out (FIFO) task queue and corresponding control flows.

At Step 420, a FIFO task queue is being maintained. Description information of a task in said task queue includes at least one data credit value reset according to a predetermined period, said data credit value being determined according to the bandwidth required by said task. The data credit value (Credit) indicates the size of amount of data of the task in the present period that may be processed and is periodically reset by a timer with the initial value being re-calculated/or re-counted after every reset according to the required bandwidth.

In one embodiment, there is one piece of task description information sent over by software stored at every row of the task queue. These description information for example include the following descriptions: SID is the unique ID throughout the system, when an application requires to open a functional unit at the FPGA, the control module will generate and return it to the application; ACC ID is an ID of a functional unit and shows which functional unit to be used by the task for processing—it is also unique throughout the FPGA system; SRC is the initial address of the original data of a task sent by the application in the memory, DST is the initial address of the calculation result of the task which is stored in memory, Length is data length of the task; BW is bandwidth of the task required the application; the data credit value indicates the size of the amount of data of the task in the present period that may be processed and is periodically reset by a time with the initial value be re-counted after every reset according to the BW.

Executing the task at the head of said task queue further include:

At Step 420, in response to the data credit value being greater than zero executing the task at the head, and adjusting said data credit value according to the amount of data having been processed.

At Step 430, not executing the task at the head in response to the data credit value being equal to zero.

Figure 5:
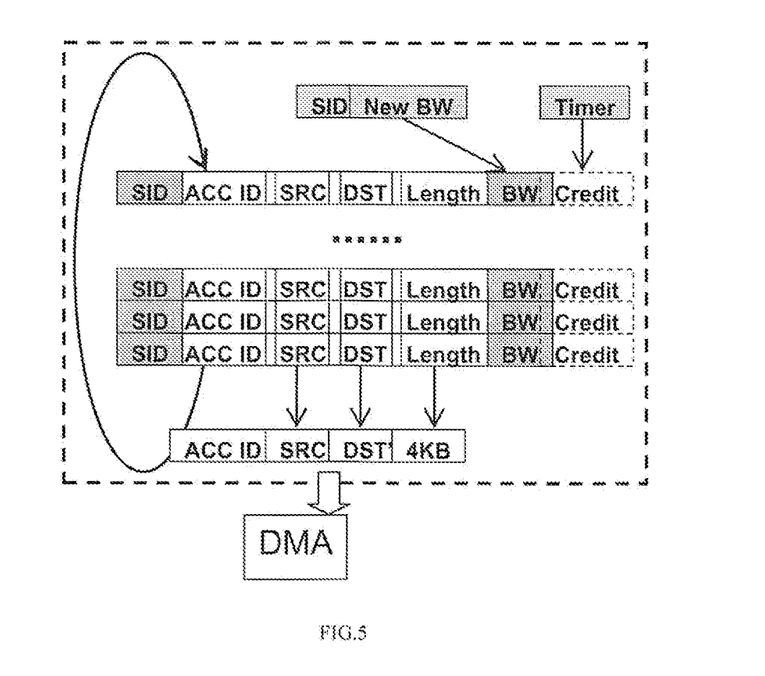
FIG. 5 shows a more specific schematic diagram of a task queue/job queue.

Performing Steps 420 and 430 will now be illustrated in a more specific example. With reference to FIG. 5, a schematic diagram of a more specific task queue is shown. New arrival tasks are added to the end of the queue, and will be executed when a task description arrives at the head of the task queue. The hardware will check the data credit value field (the field of the data credit value) of said task, if it is 0, then the task will not be executed and will be placed again at the end of the task queue. If the data credit value filed is greater than 0, e.g. greater than 4 Kbyte, then the hardware may generate a sub-task of the task which is described as ACC ID, SRC', DST', 4 KByte; the sub-task represents a functional module using ACC ID as the ID, a segment of data with the process source address being SRC', the destination address being DES', and length being 4 Kbyte (it only takes 4 KByte as a an example here and may be designed to other appropriate values); the sub-task is sent to DMA module for execution. When the sub-task is being sent, at the same time, the field of the original task is updated, the SRC increases progressively by 4 KByte, the DST increases progressively by 4 KByte, the data length (Length) of the task decreases progressively by 4 KByte, and the data credit value decreases progressively by 4 KByte. As Length decreases progressively to zero showing the task is completed, the task will be deleted from the task queue.

The key point to achieve bandwidth control lies in the initial value of the data credit value, which equals a BW filed minus the size of amount of data that have been processed in the present period. For example, if BW is equal to 100 MB/s, the period of the time is 1 s, then data credit value of the first task in the present period equals to 100 MB, and the data credit value (Credit) of the second task equals 100 MB minus the data length (Length) of the first task, if this is a negative value, then the data credit value (Credit) is set to 0. The data credit value (Credit) is calculated according to the number of periods, BW filed, Length field when the task is placed at the end of the task queue or when it is taken out of the task queue.

The method also supports dynamic alteration of the /utilization/ bandwidth limit to a certain functional unit example by a certain application and issue of an update command "SID, New BW" /attached/ with SID and new bandwidth (refer to FIG. 5), and can find the task through SID and thus updating the BW field therein.

Figure 6:
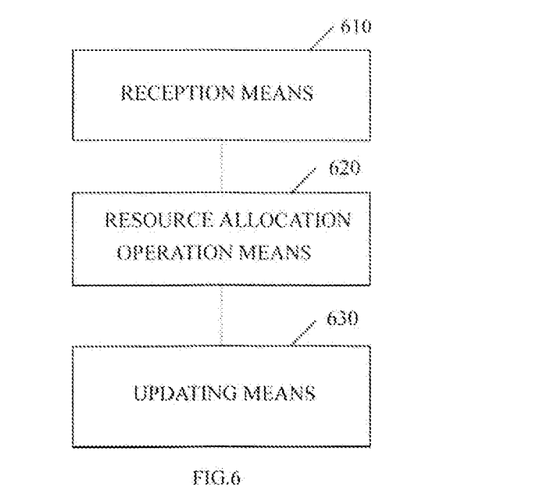
FIG. 6 is a schematic block diagram of a system for allocating FPGA resources in accordance with an embodiment of the present disclosure.

Under the same inventive concept, FIG. 6 shows a schematic block diagram of a system for allocating FPGA resources in the resource pool in accordance with an embodiment of the present invention. The embodiment will now be described in details with reference to the accompanied drawing. For the part that is similar to the above described embodiments, descriptions thereto will be omitted as appropriate. As shown in FIG. 6, the system of the embodiment includes:

A reception means 610, configured to receive resource request for FPGA resources in the resource pool from the client.

A resource allocation operation means 620, configured to perform resource allocation operation based on resource pool state information record in response to the resource request, said resource pool state information record including utilization state information of the FPGA in said resource pool.

An updating means 630, configured to update said resource pool state information record based on the result of said resource allocation operation.

In a modified/improved embodiment, said resource request includes the type and quantity of the requested programmable resources. In this embodiment, the resource allocation operation means is also configured to go through said resource pool state information record and determine the FPGA resources that satisfy the requested type and bandwidth of the functional unit based on said FPGA utilization state information and allocate to said client.

In one embodiment, said resource pool state information record further includes the functional unit information record of said FPGA, said functional unit information record including at least functional unit information having been created in said FPGA.

In another embodiment, said resource request includes requested type and bandwidth of the functional unit. Said resource allocation operation means 620 is also configured to determine whether a functional unit satisfying said resource request has been found based on said resource pool state information record and said functional unit information record; said resource allocation operation means 620 is also configured to allocate the found functional units to said client in response to a "found"; said resource allocation operation means 620 is also configured to create and allocate new functional units to said client in response to a "not found".

Wherein, said functional unit information record further includes an application information record of said functional unit, said application information record including at least the identification code of the requestor requesting said functional unit and the bandwidth of said functional unit occupied by said requestor, and wherein, said identification code of said requestor is identification information generated in response to the opening of an allocated functional unit by said requestor.

The followings means are further included: a means that is configured to maintain a First In First Out (FIFO) task queue. Description information of the task in said task queue includes at least one data credit value which is reset according to a predetermined period, said data credit value being determined according to the bandwidth required by said task; a means that is configured to, in response to said data credit value being greater than zero, execute the task at the head /of the queue/ and adjust the said data credit value according to the processed amount of data while executing the task at the head of the task queue; and a means that is configured to not e the task at the head /of queue/ in response to said data credit value being equal to zero.

The FPGA resource allocation method and system provided by the present application may be applied in IaaS to achieve virtual utilization of the FPGA resource, and so as to enrich the existing IaaS service.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for allocating FPGA resources in a resource pool, comprising:
receiving resource requests for FPGA resources in the resource pool from a client;
performing resource allocation operation based on a resource pool state information record in response to the resource request, said resource pool state information record including utilization state information of the FPGA in said resource pool; and
updating said resource pool state information record based on the result of said resource allocation operation,
wherein said resource pool state information record includes a first level of information sheet, a second level of information sheet, and a third level of information sheet,
wherein the first level of information sheet includes information of one or more FPGAs in the resource pool,
wherein the second level of information sheet includes a functional unit information record of each of the FPGAs, the functional unit information record including information of a corresponding functional unit created in each of the FPGAs, and
wherein the third level of information sheet includes an application information record of said functional unit, said application information record including at least an identification code of a requestor requesting said functional unit, said identification code of said requestor is identification information generated in response to opening of an allocated functional unit by said requestor.

2. The method according to claim 1, wherein,
said resource request includes the type and quantity of the requested programmable resources;
in said resource allocation operation, going through said resource pool state information record and determining the FPGA resources that satisfy the requested type and bandwidth of programmable resources based on said FPGA utilization state information and allocating them to said client.

3. The method according to claim 1, wherein,
said resource request includes requested type and bandwidth of the functional unit;
in said resource allocation operation, determining whether a functional unit meeting the requested type and bandwidth of the functional unit has been found based on said resource pool state information record and said functional unit information record;
allocating a found functional unit to said client in response to finding a functional unit meeting the requested type and bandwidth of the functional unit.

4. The method according to claim 3, further comprises,
creating and allocating new functional units to said client in response to not finding a functional unit meeting the requesting type and bandwidth of the functional unit.

5. The method according to claim 1, wherein said application information record further includes a bandwidth of said functional unit occupied by said requestor.

6. The method according to claim 1, further comprises:
maintaining a First In First Out (FIFO) task queue, the description information of a task in said task queue including at least one data credit value reset based on a predetermined period, said data credit value being determined based on the bandwidth required by said task;
when executing a task at the head of said task queue, in response to said data credit value being greater than zero, executing said task at the head and adjusting the said data credit value according to a processed amount of data;
in response to said data credit value being equal to zero, not executing the task at the head.

7. A system for allocating FPGA resources in a resource pool, comprising:
a reception means, configured to receive resource requests for FPGA resources in the resource pool from a client;
a resource allocation operation means, configured to perform resource allocation operation based on a resource pool state information record in response to the resource request, said resource pool state information record including utilization state information of the FPGA in said resource pool; and
an updating means, configured to update said resource pool state information record based on the result of said resource allocation operation,
wherein said resource pool state information record includes a first level of information sheet, a second level of information sheet, and a third level of information sheet,
wherein the first level of information sheet includes information of one or more FPGAs in the resource pool,
wherein the second level of information sheet includes a functional unit information record of each of the FPGAs, the functional unit information record including information of a corresponding functional unit created in each of the FPGAs, and
wherein the third level of information sheet includes an application information record of said functional unit, said application information record including at least an identification code of a requestor requesting said functional unit, said identification code of said requestor is identification information generated in response to opening of an allocated functional unit by said requestor.

8. The system according to claim 7, wherein,
said resource request includes the type and quantity of the requested programmable resources;

said resource allocation operation means is further configured to go through said resource pool state information record and determine the FPGA resources that satisfy the requested type and bandwidth of programmable resources based on said FPGA utilization state information and allocate to said client.

9. The system according to claim 7, wherein,
said resource request includes requested type and bandwidth of the functional unit;
said resource allocation operation means is further configured to determine whether a functional unit satisfying the requested type and bandwidth of the functional unit has been found based on said resource pool state information record and said functional unit information record;
said resource allocation operating means is further configured to allocate a found functional unit to said client in respond to finding a functional unit satisfying the requested type and bandwidth of the functional unit.

10. The system according to claim 9, wherein,
said resource allocation operation means is further configured to create and allocate new functional units to said client in response to not finding a functional unit satisfying the requesting type and bandwidth of the functional unit.

11. The system according to claim 9, wherein said application information record further includes a bandwidth of said functional unit occupied by said requestor.

12. The system according to claim 9, further comprises:
a means configured to maintain a First In First Out (FIFO) task queue, with description information of a task in said task queue including at least one data credit value reset according to a predetermined period, said data credit value being determined according to the bandwidth required by said task;
a means configured to perform the following operations when executing a task at the head of said task queue:
in response to said data credit value being greater than zero, executing said task at the head and adjusting the said data credit value according to a processed amount of data;
in response to said data credit value being equal to zero, not executing the task at the head.

13. A computer program product comprising a non-transitory computer readable media, the computer readable media having program code embodied thereon for configuring a computer system to perform a method to allocate FPGA resources in a resource pool, said method comprising:
receiving resource requests for FPGA resources in the resource pool from a client;
performing resource allocation operation based on a resource pool state information record in response to the resource request, said resource pool state information record including utilization state information of the FPGA in said resource pool; and
updating said resource pool state information record based on the result of said resource allocation operation,
wherein said resource pool state information record includes a first level of information sheet, a second level of information sheet, and a third level of information sheet,
wherein the first level of information sheet includes information of one or more FPGAs in the resource pool,
wherein the second level of information sheet includes a functional unit information record of each of the FPGAs, the functional unit information record including information of a corresponding functional unit created in each of the FPGAs, and
wherein the third level of information sheet includes an application information record of said functional unit, said application information record including at least an identification code of a requestor requesting said functional unit, said identification code of said requestor is identification information generated in response to opening of an allocated functional unit by said requestor.

14. The computer program product according to claim 13, wherein,
said resource request includes the type and quantity of the requested programmable resources, said method further comprising:
in said resource allocation operation, going through said resource pool state information record and determining the FPGA resources that satisfy the requested type and bandwidth of programmable resources based on said FPGA utilization state information and allocating them to said client.

15. The computer program product according to claim 13, wherein,
said resource request includes requested type and bandwidth of the functional unit, said method further comprising:
in said resource allocation operation, determining whether a functional unit meeting the requested type and bandwidth of the functional unit has been found based on said resource pool state information record and said functional unit information record;
allocating a found functional unit to said client in response to finding a functional unit meeting the requested type and bandwidth of the functional unit.

16. The computer program product according to claim 15, further comprises,
creating and allocating new functional units to said client in response to not finding a functional unit meeting the requesting type and bandwidth of the functional unit.

17. The computer program product according to claim 13, wherein said application information record further includes a bandwidth of said the functional unit occupied by said requestor.

* * * * *